United States Patent [19]
Fukui et al.

[11] Patent Number: 5,647,322
[45] Date of Patent: Jul. 15, 1997

[54] INTERNAL COMBUSTION ENGINE CONTROL APPARATUS

[75] Inventors: Wataru Fukui; Yasukazu Koezuka, both of Tokyo, Japan

[73] Assignee: Mitsubishi Denki Kabushiki Kaisha, Tokyo, Japan

[21] Appl. No.: 604,240

[22] Filed: Feb. 21, 1996

[30] Foreign Application Priority Data

Apr. 21, 1995 [JP] Japan ................................... 7-96807

[51] Int. Cl.⁶ ........................... F02D 41/22; F02D 41/26; F02P 5/15; F02P 7/067
[52] U.S. Cl. .......................... 123/414; 123/476; 123/479
[58] Field of Search .................... 123/414, 476, 123/477, 479, 487, 612, 613, 617; 73/116, 118.1

[56] References Cited

U.S. PATENT DOCUMENTS

| | | | |
|---|---|---|---|
| 5,156,125 | 10/1992 | Fukui et al. | 123/414 |
| 5,329,904 | 7/1994 | Kokubo et al. | 123/414 |
| 5,343,842 | 9/1994 | Fukui | 123/414 |
| 5,460,134 | 10/1995 | Ott et al. | 123/476 |

FOREIGN PATENT DOCUMENTS 3-168346  7/1991  Japan .

*Primary Examiner*—Andrew M. Dolinar
*Attorney, Agent, or Firm*—Sughrue, Mion, Zinn, Macpeak & Seas

[57] ABSTRACT

A control apparatus for an internal combustion engine capable of performing engine cylinder identification while ensuring a backup control upon occurrence of abnormality includes a first detector 81 for generating a first signal series REFC synchronously with rotation of a crank shaft 11, a second detector 82 for generating a second signal series POSC synchronously with rotation of a cam shaft 1, and a microcomputer 100 for controlling a parameter P for the engine from the first or second signal series. The first signal series REFC contains reference position pulses indicative of reference positions θR for cylinders. One of the pulses corresponding to a given cylinder group (#1, #4) has a shape PW1 differing from that for the other group (#2, #3). The second signal series contains angular position pulses generated at every predetermined position of the cam shaft and a cylinder identifying signal τ corresponding to cylinder (#1). The microcomputer detects a reference position θR based on the first signal series, identifies the cylinder groups based on the second signal series, determines a timing for controlling the parameter P based on the results of the identifications obtained, and outputs an abnormality decision signal upon detecting abnormality in the first or second signal series.

16 Claims, 6 Drawing Sheets

INTERNAL COMBUSTION ENGINE CONTROL APPARATUS

BACKGROUND OF THE INVENTION

1. Field of the Invention

The present invention generally relates to a control apparatus for controlling operation timings of an internal combustion engine by identifying reference positions of individual engine cylinders, respectively. More particularly, the invention is concerned with a control apparatus for an internal combustion engine which can rapidly perform cylinder identification to be reflected onto the timing control with a relative simplified structure while deriving a reference position signal relating to a crank shaft with high reliability to thereby ensure an enhanced accuracy for the timing control. Further, the invention is concerned with the apparatus is capable of carrying out a backup control of the internal combustion engine even in the case where an angular position signal containing the reference position signal or the cylinder identifying signal can not be obtained.

2. Description of Related Art

Generally, in a control system for an internal combustion engine (hereinafter also referred to simply as the engine), there are employed a reference position signal and a cylinder identifying signal generated in synchronism with rotation of the engine with a view to controlling the ignition timing, quantity of fuel to be injected into the engine and others. Usually, the signal generator for generating these signals is mounted on a cam shaft of the engine in correspondence to the engine cylinders, respectively, for detecting indirectly rotational or angular positions of a crank shaft.

For having better understanding of the present invention, technical background thereof will be descried in some detail. FIG. 8 is a perspective view showing a mechanical structure of a rotation signal generator employed in a hitherto known engine control apparatus, and FIG. 9 is a circuit diagram showing an electric signal processing circuit provided in association with the structure shown in FIG. 8, both of which are described in Japanese Unexamined Patent Application Publication No. 68252/1994 (JP-A-6-68252). Parenthetically, the internal combustion engine of concern is assumed to be a six-cylinder engine.

Referring to the figures a cam shaft 1 is driven at a speed equal to a half of the rotation speed (rpm) of a crank shaft (not shown) so that the control timings for all the six cylinders can be covered by a single rotation of the cam shaft 1.

A rotating disk 2 secured integrally to the cam shaft 1 so as to corotate therewith is formed with a series of radial slits 3a in an outer peripheral portion thereof with equal angular distance therebetween for generating an angular position signal POS composed of a series of pulses generated at every predetermined angle during rotation of the rotating disk 2 and a number of windows 3b for generating reference position signal pulses REF in one-to-one correspondence to the engine cylinders, respectively.

Light emission diodes (LEDs) 4a and 4b are disposed fixedly at a position facing a circular array of the slits 3a and a position facing a circular array of the windows 3b, respectively. Further, photodiodes 5a and 5b are disposed in opposition to the light emission diodes 4a and 4b, respectively, with the rotating disk 2 being interposed therebetween, wherein the light emission diodes 4a, 4b and photodiodes 5a, 5b cooperate to constitute photocouplers, respectively.

Referring to FIG. 9, there are provided amplifier circuits 6a and 6b connected to output terminals of the photodiodes 5a and 5b, respectively, and output transistors 7a and 7b connected to the output terminals of the amplifier circuits 6a and 6b, respectively.

The rotating disk 2, the photocouplers (4a; 5a) and (4b; 5b), the amplifier circuits 6a and 6b and the output transistors 7a and 7b cooperate to constitute a rotation signal generator 8 for generating the angular position signal POS and the reference position signal REF.

FIG. 10 is a block diagram showing an engine control system known heretofore. Referring to the FIG., the angular position signal POS and the reference position signal REF outputted from the rotation signal generator 8 are supplied to a microcomputer 10 by way of an interface circuit 9 to be utilized for controlling the ignition timing, the fuel injection quantity and other parameters involved in the operation of the engine.

FIG. 11 is a waveform diagram for illustrating the angular position signal POS and the reference position signal REF outputted from the rotation signal generator 8.

Referring to FIG. 11, the angular position signal POS is comprised of a series of pulses generated in correspondence to the slits 3a, respectively, formed in the rotating disk 2, wherein the pulses of the angular position signal POS are generated, for example, at every crank angle of 1°. Thus, the angular position signal POS can be used for measuring, for example, the angular position of the crank shaft. On the other hand, the reference position signal REF has a pulse sequence repeated upon every rotation of the crank shaft over a crank angle of 720°. More specifically, the pulse sequence of the reference position signal REF includes six pulses each rising up at a predetermined angle in correspondence to each of the engine cylinders, wherein the six pulses have respective pulse widths which differ from one to another engine cylinder so that they can be used as the cylinder identifying signal pulses, respectively.

The conventional engine control apparatus described above by reference to FIGS. 8 to 10 can discriminatively identify the individual engine cylinders and the reference positions (crank angles) on the basis of the angular position signal POS and the reference position signal REF for effectuating control of the ignition timing, the fuel injection quantity and other parameters in dependence on the engine operation states.

At this juncture, it is noted that the cam shaft 1 is driven from the crank shaft by way of a transmission mechanism such as a transmission belt/pulley mechanism (not shown). Accordingly, there may arise a phase difference in rotation between the cam shaft and the crank shaft, although it depends on the engine operation states. As a result of this, the angular positions indicated by the angular position signal POS and the reference position signal REF generated by the rotation signal generator 8 may undesirably be deviated or offset from the intrinsic or actual crank angle. When the engine operation control is performed on the basis of the signal suffering such phase deviation, the control of the ignition timing and other will naturally be accompanied with corresponding deviation, whereby it may become impossible to obtain the engine operation performance as intended.

To cope with the problem mentioned above, there has already been proposed such an apparatus which is so implemented as to generate the angular position signal POS and the reference position signal REF with high accuracy in association with the crank shaft while generating only the cylinder identifying signal pulses bearing one-to-one correspondence to the individual engine cylinders, respectively, in association with the cam shaft 1, as is disclosed, for example, in Japanese Unexamined Patent Application Publication No. 68252/1994 (JP-A-6-68252).

However, the engine control apparatus disclosed in the above publication suffers shortcomings in that the sensor as well as peripheral devices thereof provided in association with the crank shaft for generating the angular position signal POS and the reference position signal REF is much complicated and expensive and that a great difficulty is encountered in realizing a backup control in the case where either one of the angular position signal POS or the reference position signal REF becomes unavailable due to occurrence of abnormality or fault in the sensor systems provided in association with the crank shaft or when the cylinder identifying signal can not be obtained due to occurrence of abnormality or defect in the sensor provided in association with the cam shaft 1, incurring possibly shutdown of the engine operation.

As is apparent from the foregoing, the engine control apparatus known heretofore suffers a problem that the detection accuracy of the angular position signal POS and the reference position signal REF is impaired when the rotation signal generator 8 is provided in association with the cam shaft 1 because of possibility of the phase difference between the cam shaft 1 and the crank shaft, as a result of which deviation or error is involved in the control of the ignition timing and other functions, presenting a great obstacle in realizing optimally the engine performance as intended.

On the other hand, in the case of the engine control apparatus such as disclosed in Japanese Unexamined Patent Application Publication No. 68252/1994 (JP-A-6-68252) where the angular position signal POS and the reference position signal REF are generated by the sensor device provided in association with the crank shaft, while the cylinder identifying signal is generated by the detecting means provided in association with the cam shaft, there arises problems that the sensor and peripheral devices provided in association with the crank shaft are much complicated and that the backup control can not be carried in the case where the angular position signal POS, the reference position signal REF or the cylinder identifying signal becomes unavailable due to occurrence of fault in the associated detection system.

SUMMARY OF THE INVENTION

In the light of the state of the art described above, it is an object of the present invention to provide an engine control apparatus which is capable of performing rapidly and accurately the engine cylinder identification to be reflected to the timing control of the engine with a relatively simplified structure.

It is another object of the present invention to provide an engine control apparatus which allows a reference position signal to be acquired with high reliability in association with the crank shaft to thereby enhance the accuracy of the timing control involved in the control of engine operation.

It is yet another object of the present invention to provide an engine control apparatus which is capable of performing a backup control even in the case where a reference position signal containing cylinder group identification information or an angular position signal containing a cylinder identifying signal is not available due to abnormality of associated sensor or detection systems.

In view of the above and other objects which will become apparent as the description proceeds, there is provided according to a general aspect of the present invention a control apparatus for an internal combustion engine, which apparatus includes a first signal detector means for generating a first signal series in synchronism with rotation of a crank shaft of the internal combustion engine, a second signal detector means for generating a second signal series in synchronism with rotation of a cam shaft driven with a speed reduction ratio of "½" relative to the crank shaft, and a control means for controlling parameter involved in operation of the internal combustion engine on the basis of at least one of the first and second signal series. The first signal series includes a reference position signal generated at every first predetermined angular position of the crank shaft in correspondence to reference positions of engine cylinders, respectively. The reference position signal includes pulses corresponding to the cylinders, respectively, wherein one of the pulses corresponding to a given one of cylinder groups has a pulse shape differing from a pulse shape of the other pulse corresponding to the other cylinder group. Each of the cylinder groups includes the engine cylinders which can be controlled essentially simultaneously. The second signal series includes an angular position signal generated at every second predetermined angular position of the cam shaft and a cylinder identifying signal corresponding to a given one of the engine cylinders. The control means includes a reference position detecting means for detecting the aforementioned reference position on the basis of at least the first signal series, a cylinder group identifying means for identifying the cylinder groups, respectively, on the basis of at least the first signal series, a cylinder identifying means for identifying the cylinders, respectively, on the basis of at least the second signal series, and a control timing arithmetic means for arithmetically determining a timing for controlling the parameter on the basis of result of identification outputted from at least one of the cylinder group identifying means and the cylinder identifying means.

Parenthetically, with the phrase "cylinder group", it is contemplated to mean a group of cylinders which can be controlled essentially simultaneously.

By providing the first detector for detecting the first signal series containing the reference position signal pulses for the cylinder groups, respectively, in association with the crank shaft as described above while providing the second detector for detecting the second signal series (i.e., angular position signal containing the cylinder identification signal corresponding to the given or specific cylinder), it is possible to enhance the accuracy of timings for controlling the operation of the internal combustion engine without incurring any appreciable increase in the cost for implementing the control apparatus. Furthermore, by providing the second detector for detecting the second signal series (containing the cylinder identifying signal and the angular position signal) in association with the cam shaft, the cylinder identification can easily and reliably be realized. Besides, owing to combination of the reference position signal, the cylinder identifying signal and the angular position signal with one another as described above, the cylinder group identification, the cylinder identification and the reference position identification can be carried out rapidly and reflected onto the timing control for the engine operation. Further, a backup control can be effected by using the second signal series which permits the cylinder identification, the internal combustion engine control function can be ensured at least to a necessary minimum even in the case where the first signal series is unavailable, as will be described hereinafter. Moreover, even when the second signal series is unavailable, the backup control can be effected by simultaneous ignition control for the cylinder group on the basis of the first signal series which allows the cylinder group identification, as described hereinafter.

In a preferred mode for carrying out the invention, the pulse contained in the reference position signal and corresponding to the given one cylinder group may differ in pulse width from the pulse corresponding to the other cylinder group.

Owing to the arrangement described above, the cylinder group identification can be facilitated.

In another preferred mode for carrying out the invention, the reference position signal may contain an additional pulse generated within a predetermined angular range in the vicinity of the pulse corresponding to the given one cylinder group.

By virtue of the feature mentioned above, the cylinder group including the cylinders which can be controlled essentially simultaneously can be identified easily and speedily with enhanced reliability.

In yet another preferred mode for carrying out the invention, the pulse contained in the reference position signal and corresponding to the given one cylinder group may be so generated as to overlap the cylinder identifying signal in respect to the phase.

Owing to the feature described above, the counted values of the angular position signal pulses counted during the pulse durations of the reference position signal pulses, respectively, can be made different distinctly from each other, whereby the cylinder identification can be realized with high reliability.

In a still another preferred mode for carrying out the invention, the control timing arithmetic means may be so arranged or programmed as to arithmetically determine the control timing for the parameter on the basis of result of the cylinder identification performed by the cylinder identifying means, the reference positions for the cylinders and the count value of the angular position signal pulses.

With the arrangement described above, the control timing can be determined with enhanced accuracy.

In a further preferred mode for carrying out the invention, the cylinder group identifying means may be so arranged or programmed as to count the angular position signal pulses during periods corresponding to pulse widths contained in the reference position signal to thereby identify the given one cylinder group on the basis of the result of the counting.

With the engine control apparatus of the structure described above, the cylinder group identification can be achieved with high reliability.

In a yet further preferred mode for implementing the engine control apparatus according to the invention, the cylinder group identifying means may be so arranged or programmed as to identify the cylinder groups, respectively, on the basis of duty ratios of the pulses contained in the reference position signal.

By arithmetically determining the duty ratios of the cylinder identifying signal pulses, as mentioned above, the cylinder group identification can be realized with high accuracy even when the second signal series can not be obtained due to abnormality of the associated detector or sensor system, whereby the backup control for simultaneously igniting the cylinders belonging to the same cylinder groups, respectively, can be realized with high accuracy and reliability.

In a still further preferred mode for realizing the control apparatus according to the invention, the cylinder identifying means may be so arranged as to identify the given one cylinder on the basis of the cylinder identifying signal contained in the second signal series, while identifying the other cylinders on the basis of count values obtained by counting the angular position signal pulses, respectively, starting from the given one cylinder identifying signal.

With the arrangement described above, the cylinder identification for determining the control timings for the individual cylinders, respectively, can be realized even when the first signal series is unavailable due to abnormality of the associated sensor or detector system.

In another preferred mode for carrying out the invention, the cylinder identifying signal may be represented by a constant low "L" level interval during which the angular position signal pulses are not generated continuously over a predetermined angular range.

With the above arrangement, the cylinder group identification can be realized in a much simplified manner.

In yet another preferred mode for carrying out the invention, the cylinder identifying signal may be represented by a constant high "H" level interval during which the angular position signal pulses are concatenated continuously over a predetermined angular range.

With the above arrangement, the cylinder group identification can be realized in a much simplified manner.

In still another preferred mode for carrying out the invention, the cylinder identifying signal may be represented by a pulse having a level differing from that of the angular position signal pulses.

By virtue of the above arrangement, the cylinder group identification can be performed easily and speedily with high reliability.

In a further preferred mode for carrying out the invention, the engine control apparatus may be so arranged that the first signal detecting means includes a first rotating disk fixedly mounted on the crank shaft which has an outer peripheral edge formed with first and second projections extending radially outwardly, the first projection having a length differing from that of the second projection as viewed in a circumferential direction of the first rotating disk, and a first sensor means disposed stationarily in opposition to the outer peripheral edge of the first rotating disk for detecting the radial projections to thereby generate the first signal series. The pulse for the given one cylinder group is generated in response to detection of the first projection. The second signal detecting means includes a second rotating disk fixedly mounted on a cam shaft of the engine for corotation therewith. The cam shaft is operatively connected to the crank shaft by way of a transmission means which has a reduction ratio of "½". The second rotating disk has an outer peripheral edge formed with a plurality of teeth projecting extending radially outwardly with a pitch corresponding to the predetermined angle of the crank shaft, and a non-toothed segment which extends along the outer periphery of the second rotating disk over a predetermined angular range and in which the teeth are absent. The second sensor means is so disposed stationarily in opposition to the outer peripheral edge of the second rotating disk as to detect the teeth and the non-toothed segment to thereby generate the second signal series containing the angular position signal pulses and the constant level duration, respectively.

In a yet further preferred mode for carrying out the invention, position of a trailing edge of the non-toothed segment as viewed in a rotational direction of the first rotating disk may be so selected as to define the reference position for determining the control timing for the given one cylinder group including the cylinders which can be controlled substantially simultaneously.

With the arrangements of the signal detecting means described above, the control apparatus can be implemented rigidly and inexpensively in a simplified structure while ensuring high accuracy as well as enhanced reliability for the generation of the timing control signal.

According to another aspect of the invention, there is provided an engine control apparatus of the structure described above, wherein the control means further includes an abnormality decision means for outputting an abnormality decision signal to at least said control timing arithmetic means upon detection of abnormality in one of said first and second signal series.

With the arrangements described above, backup control functions for determining the control timing for sustaining operation of the internal combustion engine can be ensured even when abnormality should occurs in the first signal series (first detecting system) or the second signal series (second detecting system) with a simplified and inexpensive structure of the detector or sensor system.

In a still further preferred mode for carrying out the invention, the control timing arithmetic means may be so arranged or programmed that in response to generation of the abnormality decision signal indicating abnormality of the second signal series by the abnormality decision means, the control timing arithmetic means arithmetically determines the control timing for the parameter on the basis of the result of the cylinder group identification outputted from the cylinder group identifying means and the reference positions for the cylinder groups, respectively.

By virtue of the arrangement described above, the backup control can be performed on the basis of only the first signal series even when abnormality occurs in the second signal series, whereby the engine operation performance required to a necessary minimum can be ensured.

Furthermore, the control arithmetic means may be arranged such that when the abnormality decision signal is generated to indicate abnormality of the first signal series, the control timing arithmetic means arithmetically determines the control timing for the parameter on the basis of the result of the cylinder identification outputted from the cylinder identifying means and the count value of pulses of the angular position signal.

With the arrangement described above, the backup control can be performed on the basis of only the second signal series upon occurrence of abnormality or failure in the first signal series, whereby the engine operation performance required to a necessary minimum can be maintained.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
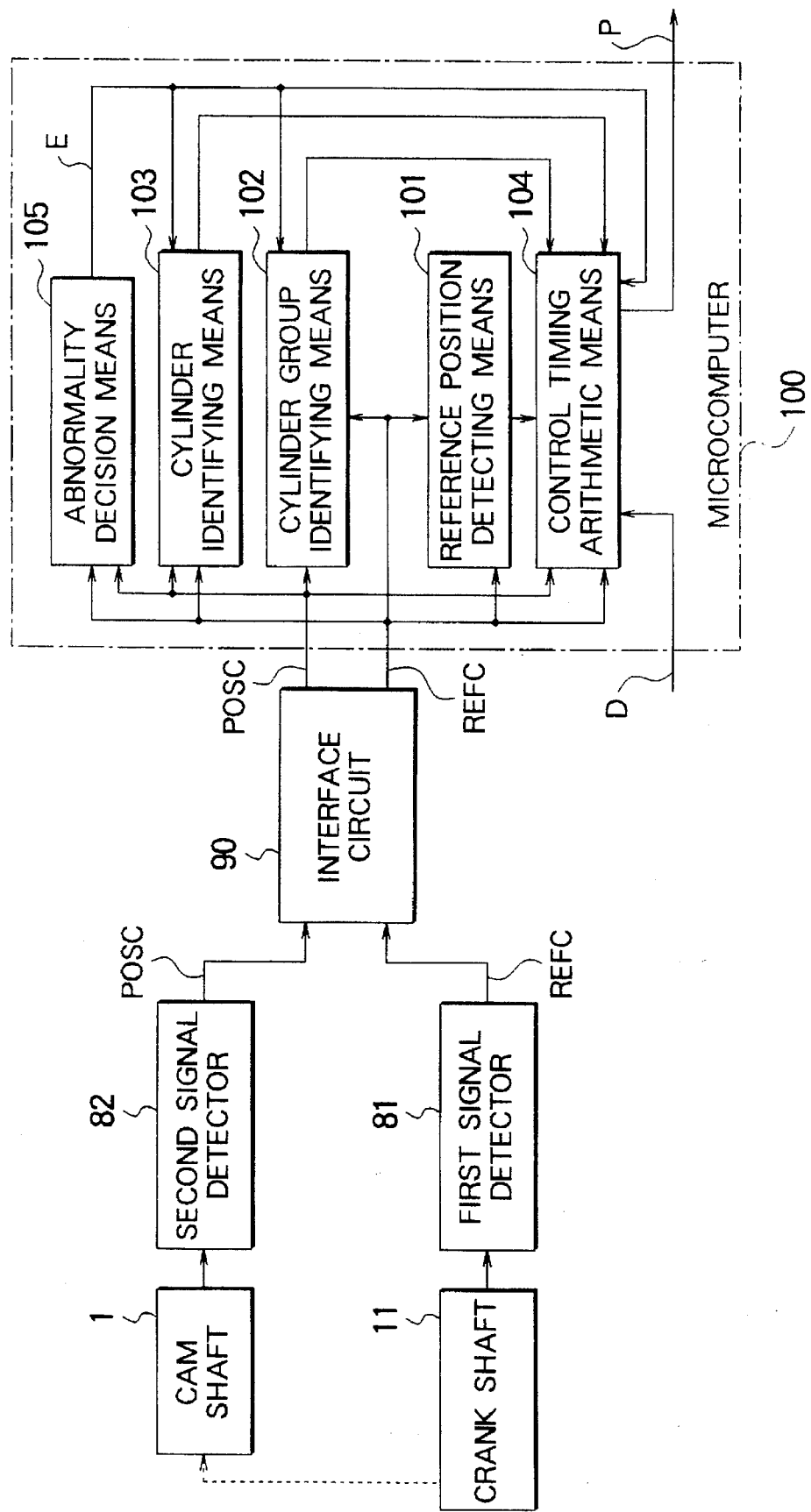
FIG. 1 is a functional block diagram showing schematically a general arrangement of an engine control apparatus according to a first embodiment of the invention.

The present invention will be described in detail in conjunction with what is presently considered as preferred or typical embodiments thereof by reference to the drawings. In the following description, like reference characters designate like or corresponding parts throughout the several views.

Embodiment 1

Figure 2:
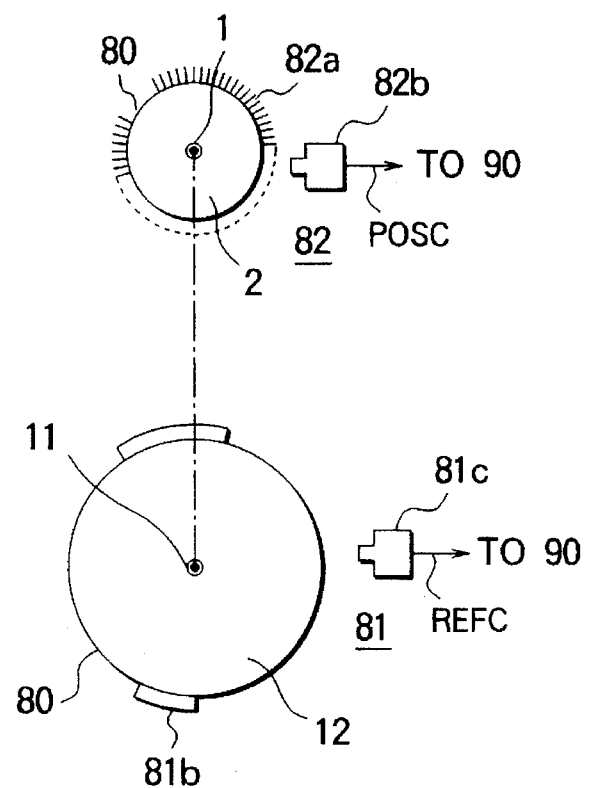
FIG. 2 is a view showing schematically structures of first and second signal detectors employed in the engine control apparatus according to the first embodiment of the invention.
Figure 3:
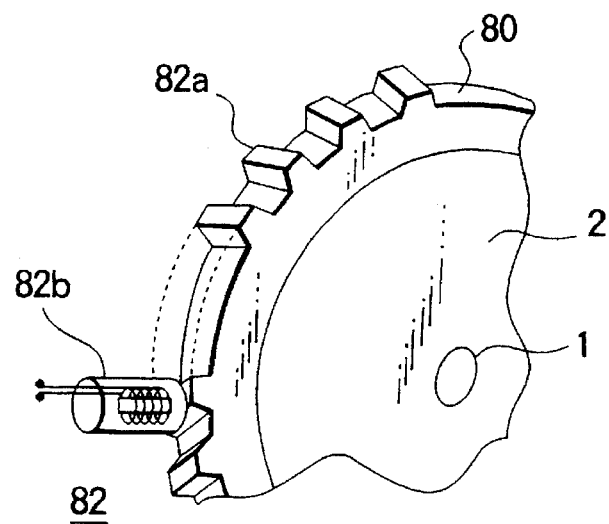
FIG. 3 is a fragmental perspective view showing exaggeratedly the first signal detector shown in FIG. 2.
Figure 4:
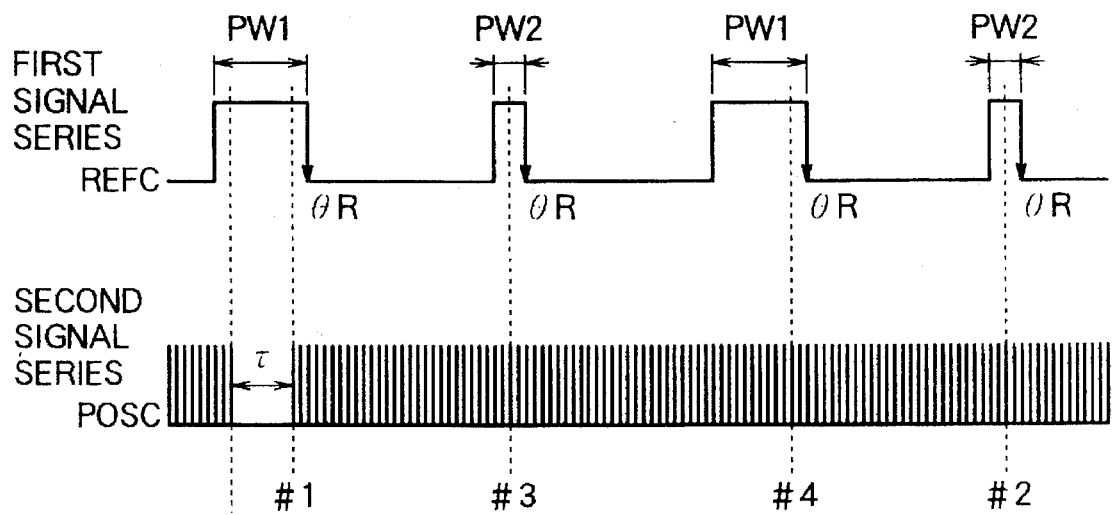
FIG. 4 is a waveform diagram for illustrating, by way of an example, the first and second signal series generated in the engine control apparatus according to the first embodiment of the present invention.

Now, the control apparatus according to a first embodiment of the present invention will be described by reference to FIGS. 1 to 4, wherein FIG. 1 is a functional block diagram showing schematically a general arrangement of the control apparatus according to the instant embodiment of the invention, FIG. 2 is a view showing schematically structures of signal detectors employed in the control apparatus shown in FIG. 1, FIG. 3 is a fragmental perspective view showing exaggeratedly a second signal detector, and FIG. 4 is a waveform diagram for illustrating, by way of an example, first and second signal series generated in the control apparatus according to the instant embodiment of the invention.

In the internal combustion engine (not shown) to which the invention is applied, there is provided a cam shaft 1 which rotates in synchronism with a crank shaft 11 of the engine by way of a transmission mechanism such as a belt drive mechanism or the like with a speed reduction ratio of "½" relative to the crank shaft 11, as can be seen in FIG. 2.

Referring to FIG. 2, a first signal detector generally denoted by a reference numeral 81 is designed to output a first signal series REFC in synchronism with the rotation of the crank shaft 11. To this end, the first signal detector 81 is constituted by a rotating disk 12 mounted integrally on the crank shaft 11 for corotation therewith, a pair of projections 81a and 81b formed in the rotating disk 12 along an outer peripheral edge thereof, being spaced each other by a predetermined angular distance (e.g. a crank angle of 180°), in correspondence to cylinder groups, respectively, each group including a predetermined number of cylinders which can simultaneously be controlled (e.g. two cylinders in the case of the four-cylinder engine), and a sensor 81c which may be constituted by an electromagnetic pickup device, Hall element, magnetoresistance type sensor device or the like. More specifically, the projections 81a, 81b are provided at two discrete positions approximately in diametrical opposition to each other, wherein the projection 81a corresponding to a given or specific cylinder group (described hereinafter) extends over a greater angular distance than the other projection 81b.

Referring to FIG. 4, the first signal series REFC generated by the first signal detector 81 in response to the projections 81a, 81b during the rotation of the crank shaft 11 is composed of reference position signal pulses generated at every first predetermined angle (i.e., 180° in crank angle) in correspondence to the individual engine cylinders #1 to #4, respectively, wherein the falling edges of the reference position signal pulses (corresponding to the trailing edge of the projections 81a and 81b, respectively) indicate the reference positions θR for the individual cylinders, respectively. Furthermore, the reference position signal pulse for the given or specific cylinder group including the cylinders #1 and #4 which can be controlled simultaneously has a greater duration or pulse width PW1 than that PW2 of the reference position signal pulse for the other cylinder group including the cylinders #2 and #3 which can also be controlled essentially simultaneously.

Referring to FIG. 2 together with FIG. 3, a second signal detector 82 designed to output a second signal series POSC in synchronism with the rotation of the cam shaft 1 is comprised of a rotating disk 2 mounted integrally on the cam shaft 1 so as to corotate therewith, a plurality of teeth 82a formed in the rotating disk 2 around an outer peripheral edge thereof with a second predetermined angular equi-distance (e.g. for every crank angle in a range of 1° to 10°) and a sensor 82b which may be constituted by an electromagnetic pickup device, a Hall element, a magnetoresistance type sensor device or the like disposed in opposition to the teeth 82a.

In the case of the structure shown in FIG. 3, it is assumed, by way of an example only, that the sensor 82b is constituted by an electromagnetic pickup device. Same holds true for the sensor 81c mentioned previously.

Referring to FIG. 4, a second signal series POSC generated in response to the teeth 82a as the cam shaft 1 is rotated includes angular position signal pulses generated in response to the teeth 82a, respectively, at every second predetermined angular position (e.g. at every crank angle of 1°) of the crank shaft 11 in synchronism with the rotation thereof, and a constant level interval τ of "L" level generated at a time point close to the reference position θR of a given or specific one (cylinder #1) of the cylinders of the internal combustion engine. The constant level interval τ serves as a cylinder identifying signal for identifying the given or specific cylinder (e.g. the cylinder #1) and is generated at every crank angle of 720°.

The angular position signal contained in the second signal series POSC includes a series of pulses which are generated in correspondence to the individual teeth 82a formed in succession around the outer peripheral edge of the rotating disk 2, wherein in the circumferential row of the teeth 82a, there is provided for the purpose of generating the constant level interval τ a non-toothed portion or segment 80 in which the teeth 82a are absent over a predetermined angular range (e.g. from ten to several ten degrees in crank angle) and thus the pulses of the angular position signal are not generated in continuation. It is to be noted that the non-toothed segment 80 is provided at one location (at every crank angle of 720°) along the outer peripheral edge of the rotating disk 2 mounted integrally on the cam shaft 1.

The first and second signal series REFC and POSC are inputted to a microcomputer 100 by way of an interface circuit 90.

The microcomputer 100 constitutes a control means for controlling parameters P involved in the operation of the internal combustion engine. To this end, the microcomputer 100 is comprised of a reference position detecting means 101 for detecting the reference positions from at least the first signal series REFC, a cylinder group identifying means 102 for discriminatively identifying each of the cylinder groups on the basis of at least the first signal series REFC, a cylinder identifying means 103 for identifying the individual cylinders on the basis of at least the second signal series POSC, a control timing arithmetic means 104 for arithmetically determining or calculating control timings for the engine operation parameters P in accordance with the result of the identification outputted from at least one of the cylinder group identifying means 102 and the cylinder identifying means 103, and an abnormality decision means 105 for outputting an abnormality decision signal E at least to the control timing arithmetic means 104 upon detection of occurrence of a failure in one of the first signal series REFC and the second signal series POSC.

The cylinder group identifying means 102 is so designed or programmed as to identify the engine cylinder groups on the basis of a pulse duty ratio of the first signal series REFC (reference position signal), e.g. the duty ratio between the "L" level interval and the "H" level interval of the first signal series REFC or alternatively a count value of the angular position signal pulses of the second signal series POSC counted during the pulse duration PW1 or PW2 of the first signal series REFC. On the other hand, the control timing arithmetic means 104 is so arranged or programmed as to arithmetically determine or calculate the control timing for the parameter P (e.g. ignition timing and the like) on the basis of the result of the reference position identification for the cylinder groups or individual cylinders while counting the angular position signal pulses contained in the second signal series POSC.

More specifically, when the system operates normally, the cylinder group identifying means 102 measures the pulse widths PW1 and PW2 of the reference position signal contained in the first signal series REFC by counting the angular position signal pulses contained in the second signal series POSC, to thereby identify the cylinder groups on the basis of the result of the measurement.

On the other hand, upon occurrence of abnormality such as occurrence of unavailability of the second signal series POSC, the cylinder group identifying means 102 responds to the abnormality decision signal E issued by the abnormality decision means 105 to thereby discriminatively identify the individual cylinder groups by using only the first signal series REFC. More specifically, the cylinder group identifying means 102 identifies the specific cylinder group and the other cylinder group discriminatively from each other on the basis of the duty ratio between the low "L" and high "H" level intervals or durations of the reference position signal. In this manner, a backup control can be realized by the control timing arithmetic means 104.

Similarly, so long as the sensor system operates normally, the control timing arithmetic means 104 arithmetically determines or calculates the control parameter P (control timing) for the engine operation by counting the angular position signal pulses contained in the second signal series POSC while utilizing the reference position θR derived from the first signal series REFC as well as the result of the cylinder identification based on the second signal series POSC.

By contrast, upon occurrence of abnormality, for example, in the first signal series REFC, the control timing arithmetic means 104 responds to the abnormality decision signal E issued by the abnormality decision means 105, indicating occurrence of abnormality in the first signal series REFC, to thereby realize the backup control by utilizing the result of the cylinder identification performed as based on only the second signal series POSC. To this end, the time point at which the constant level interval τ of the second signal series POSC is terminated (i.e., the time point at which generation of the succeeding angular position signal is started) is so determined as to coincide with, for example, the ignition control timing at which the engine operation performance required to a necessary minimum can be ensured.

Similarly, the control timing arithmetic means 104 responds to the abnormality decision signal E indicating occurrence of abnormality in the second signal series POSC to thereby perform the backup control such as simultaneous firing for the cylinders belonging to the same group by using only the result of the cylinder group identification performed by the cylinder group identifying means 102 on the basis of only the first signal series REFC.

Parenthetically, in the normal state, the control timing arithmetic means 104 arithmetically determines the control parameters P such as the ignition timing, the fuel injection quantity and others by reference to data stored in the form of a map in a memory (not shown) on the basis of operation state signals D supplied from a variety of sensors (not shown), to thereby control the individual engine cylinders in accordance with the control parameters P as determined.

Now, referring to FIG. 4, description will be made in more detail of operation of the control apparatus implemented in the structure shown in FIGS. 1 to 3 according to the first embodiment of the present invention.

As mentioned previously, the rotating disk 12 having the projections 81a, 81b formed at every first predetermined angle (e.g. at every crank angle of 180°) is mounted on the crank shaft 11 with the sensor 81c being disposed in opposition to the projections 81a, 81b to thereby constitute the first signal detector means 81 for generating the first signal series REFC (reference position signal) which indicates the reference positions θR for the individual engine cylinders, respectively.

On the other hand, the rotating disk 2 having the teeth 82a formed at every second predetermined angle (e.g. at every crank angle of 1°) and having the non-toothed segment 80 corresponding to the specific cylinder is mounted on the cam shaft 1 with the sensor 82b being disposed in opposition to the teeth 82a and the non-toothed segment 80 to thereby constitute the second signal detector means 82 for generating the second signal series POSC which contains the angular position signal pulse and the cylinder identifying signal.

One (81a) of the projections 81a, 81b formed in the rotating disk 12 mounted on the crank shaft 11 which corresponds to the pulse width PW1 of the first series signals REFC for the specific cylinder extends over a greater angular distance as viewed in the circumferential direction of the rotating disk 12, while the other projection 81b corresponding to the pulse width PW2 of the reference position signal for the other cylinder group is formed in a shorter length. Furthermore, the trailing end positions at which projections 81a and 81b are terminated, respectively, as viewed in the rotating direction of the rotating disk 12, correspond to the reference positions θR for the respective cylinder groups (#1; #4 and #2; #3), respectively.

On the other hand, the teeth 82a formed in the rotating disk 2 which is provided in association with the cam shaft 1 correspond to the angular position signal pulses to be generated at every first predetermined crank angle (e.g. crank angle of 1°) and thus formed in the circumferential edge of the rotating disk 2 at every predetermined angle (e.g. 0.5°). Further, because the non-toothed segment 80 corresponds to the constant level interval τ indicating the given or specific cylinder and having a predetermined duration (equivalent to a crank angle of ten to several ten degrees), the non-toothed segment 80 is formed over a predetermined angular range (of 5° to 30°) in the rotating disk 2. The non-toothed segment 80 is detected by the sensor 82b which converts the presence/absence of the teeth 82a into an angular position signal to be subsequently inputted to the microcomputer 100 as the second signal series POSC, wherein the cylinder identifying means 103 incorporated in the microcomputer 100 is so programmed as to detect the constant level interval τ on the basis of the duty ratios of the angular position signal pulses.

By virtue of such arrangement that in the first signal series REFC (see FIG. 4) generated in correspondence to the projections 81a as the crank shaft 11 is rotated, the reference position signal corresponding to the specific cylinder group (cylinders #1 and #4) has a pulse width PW1 which is greater than that PW2 of the other cylinder group (cylinders #3 and #2) so that the cylinder group identifying means 102 can easily identify the individual cylinder groups discriminatively from each other on the basis of these pulse width PW1 and PW2. Furthermore, because the falling edge of the individual reference position signal pulses PW1 and PW2 of the first signal series REFC indicates the reference positions θR for the individual cylinders, respectively, the reference position detecting means 101 can detect the reference positions θR without any difficulty.

Besides, because the reference position signal (PW1) for the specific cylinder group overlaps the cylinder identifying signal (i.e., constant level interval τ) in respect to the phase, the count value of the angular position signal pulses for the specific cylinder (#1) decreases by a proportion equivalent to the duration of the constant level interval τ (i.e., a number of the teeth 82a not formed in the non-toothed segment 80). Thus, the cylinder identifying means 103 can easily identify the specific cylinder (#1).

In this manner, the control timing arithmetic means 104 can arithmetically determine the parameter P on the basis of the results of the cylinder identification processings and the reference position θR mentioned above as well as the angular position signal pulses.

The terminal end of the constant level interval τ can be made use of for arithmetical determination of the timing for controlling the parameter such as ignition timing to thereby carry out a backup control in the case where a failure occurs in the first signal series REFC.

More specifically, upon detection of a failure in the first signal series REFC by the abnormality decision means 105, the control timing arithmetic means 104 cooperates with the cylinder identifying means 103 to set the time point at which the constant level interval τ is terminated as the control timing for the specific cylinder and determines sequentially the control timings for the other cylinders at every crank angle of 180° by counting the angular position signal pulses, starting from the time point as determined. In this way, the control timings for the specific cylinder and other cylinders can discriminatively be determined on the basis of only the second signal series POSC, whereby the engine control capability as required can be ensured at least to a necessary minimum.

On the other hand, upon starting of the engine or upon occurrence of abnormality in the second signal series POSC, the control timing arithmetic means 104 cooperates with the cylinder group identifying means 102 to perform the backup control on the basis of only the first signal series REFC.

More specifically, the cylinder group identifying means 102 discriminates the pulse widths PW1 and PW2 from each other by determining the duty ratio of the reference position signal to thereby identify the specific cylinder group and the other cylinder group discriminatively.

On the basis of the output of the cylinder group identifying means 102, the control timing arithmetic means 104 can speedily identifying the groups of the cylinders which can be ignited simultaneously and control the ignition of the cylinders on a group-by-group basis by using the reference position θR as the control timings, whereby the engine control capability required can be realized at least to a necessary minimum. In other words, the ignition timing and the fuel injection quantity for the engine cylinders can be controlled on a group-by-group basis without need for stopping operation of the internal combustion engine even when the second signal series POSC is unavailable.

The abnormality decision means 105 is so designed or programmed as to generate the abnormality decision signal E in case the first signal series REFC or the second signal series POS can not normally be obtained (e.g. when the first signal series REFC or the second signal series POSC remains continuously at a constant level or exhibits abnormal pulse width) due to fault of the sensor 81c or the sensor 82b, for example, wherein the abnormality decision signal E is inputted to the cylinder group identifying means 102, the cylinder identifying means 103 and the control timing arithmetic means 104.

In response to the abnormality decision signal E, the control timing arithmetic means 104 cooperates with the cylinder group identifying means 102 or the cylinder identifying means 103 to perform the backup control of the engine operation by controlling the parameters P by using only one of the first signal series REFC and the second signal series POS.

As is apparent from the foregoing, by generating the first signal series REFC containing the reference position signal indicating the reference positions θR for the cylinder groups, respectively, in association with the crank shaft 11, it is possible to detect the crank angle and the reference position θR with high accuracy because the problem of the phase difference due to intervention of the transmission mechanism such as belt/pulley transmission can successfully be solved, which in turn means that the ignition timing and the fuel injection quantity can be controlled with high reliability.

Additionally, because the pulse widths PW1 and PW2 of the first signal series containing the reference position signal are set distinctly for the cylinder groups, respectively, the cylinder group can speedily and easily be identified upon every detection of the reference position signal pulses PW1 and PW2, whereby the ignition timing control as well as the fuel injection control can speedily and optimally be performed particularly upon starting of the engine operation.

Furthermore, by virtue of the arrangement for generating the second signal series POSC containing the cylinder identifying signal (i.e., constant level interval τ) in association with the cam shaft 1, the engine cylinders can discriminatively be identified without fail.

Embodiment 2

In the control apparatus according to the first embodiment of the invention, the pulse shape of the reference position signal for the specific cylinder group is made to differ from that for the other cylinder group in respect to the pulse width (PW1, PW2). According to the teachings of the present invention incarnated in a second embodiment thereof, it is proposed to identify the specific cylinder group by generating an additional pulse within a predetermined angular range relative to the reference position signal pulse for the specific group.

Figure 5:
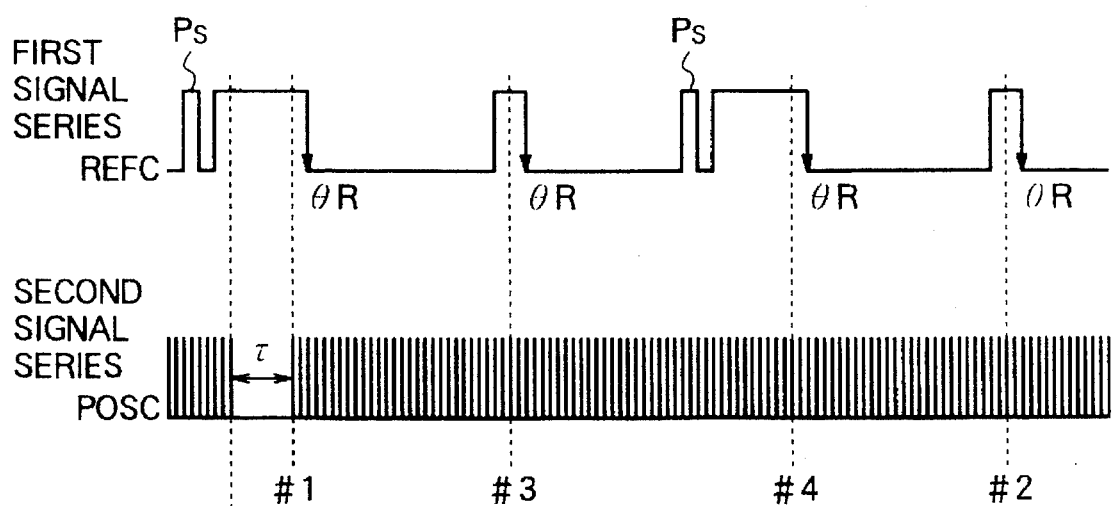
FIG. 5 is a waveform diagram for illustrating operation of an engine control apparatus according to a second embodiment of the invention.

FIG. 5 is a waveform diagram for illustrating operation of the control apparatus according to the instant embodiment of the invention according to which an additional pulse Ps is generated in the vicinity of the reference position signal pulse for the specific cylinder group.

At this juncture, it should be mentioned that although one additional pulse Ps is generated immediately before the reference position signal pulse for the specific cylinder group, the additional pulse may be generated immediately in succession to the reference position signal pulse for the specific cylinder group. Besides, the number of the additional pulse is never limited to one but a number of additional pulses determined rather arbitrarily can be used substantially to the same effect.

By using the first signal series REFC of the waveform illustrated in FIG. 5, the specific cylinder group and the other cylinder group can discriminatively be identified by detecting whether or not the additional pulse Ps makes appearance within a predetermined angular range relative to the reference position signal pulse. Thus, the procedure for measuring the pulse widths of the reference position signal can be rendered unnecessary, whereby the cylinder groups can be identified speedily with high accuracy. Needless to say, generation of such additional pulse(s) may easily be realized by forming an additional projection or projections (not shown) in the vicinity of the projection 81a of the rotating disk 12.

In the case of the control apparatus according to the instant embodiment of the invention, the presence or generation of the additional pulse Ps within the predetermined angular range relative to the pulse (PW1) can be detected by counting the angular position signal pulses contained in the second signal series POSC when the first signal series REFC and the second signal series POSC suffer no abnormality or by comparing the duty ratio of the pulses contained in the first signal series REFC unless the second signal series POSC is available.

Thus, the control timing arithmetic means 104 can carry out in continuation the backup control as desired by using as the control timings the falling edge timings of the reference position signal pulses (which are coincident among the individual cylinders as indicated by arrows in FIG. 5) for the cylinder groups, respectively.

The backup control in the case where the first signal series REFC is not available is performed in the substantially same manner as described previously, which can readily be understood without need for repetitive description.

Embodiment 3

Figure 6:
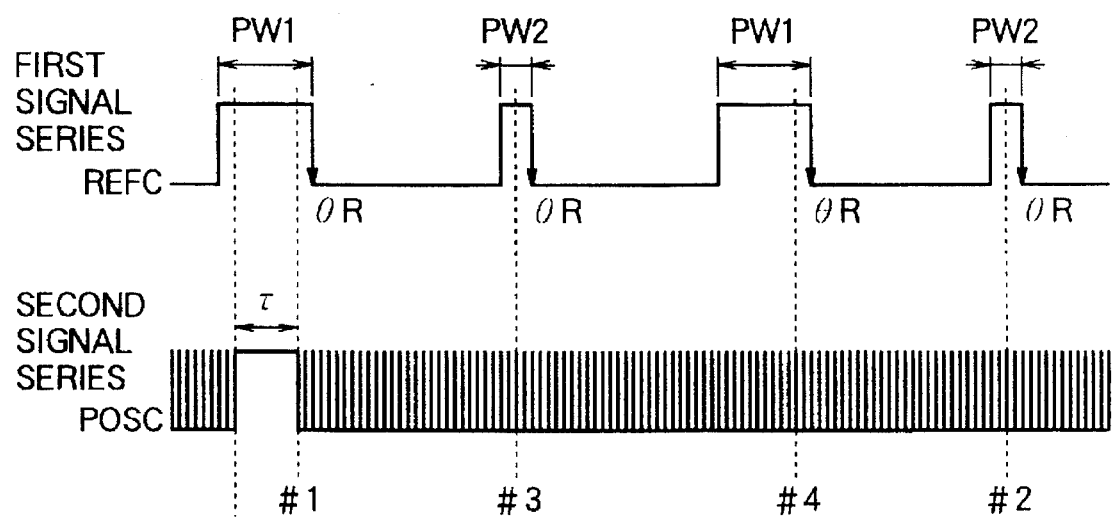
FIG. 6 is a waveform diagram for illustrating operation of an engine control apparatus according to a third embodiment of the invention.

In the case of the control apparatuses according to the preceding embodiments of the invention, the non-toothed segment 80 is provided in the series or row of the teeth 82a formed in the circumferential edge of the rotating disk 2 mounted on the cam shaft 1 so that the constant level interval τ representing the cylinder identifying signal for the specific cylinder has a low "L" level. By contrast, according to the instant embodiment of the invention, it is proposed that in place of the non-toothed segment 80, a continuous protrusion (not shown) formed in the row of teeth 82a so that the constant level interval τ has a high "H" level, as is illustrated in FIG. 6.

In this case, difference from the preceding embodiments resides in only the polarity of the signal pulse corresponding to the constant level interval τ. Accordingly, the processings executed by the microcomputer 100 can be performed substantially in a same manner as described hereinbefore by taking into account only the polarity of the pulse representing the constant level interval τ.

Embodiment 4

In the control apparatuses described above, the constant level interval τ during which no angular position signal pulses are generated is used as the cylinder identifying signal. However, a pulse having a level differing from that of the angular position signal pulses generated in succession in the second signal series POSC may be employed substantially to the same effect.

Figure 7:
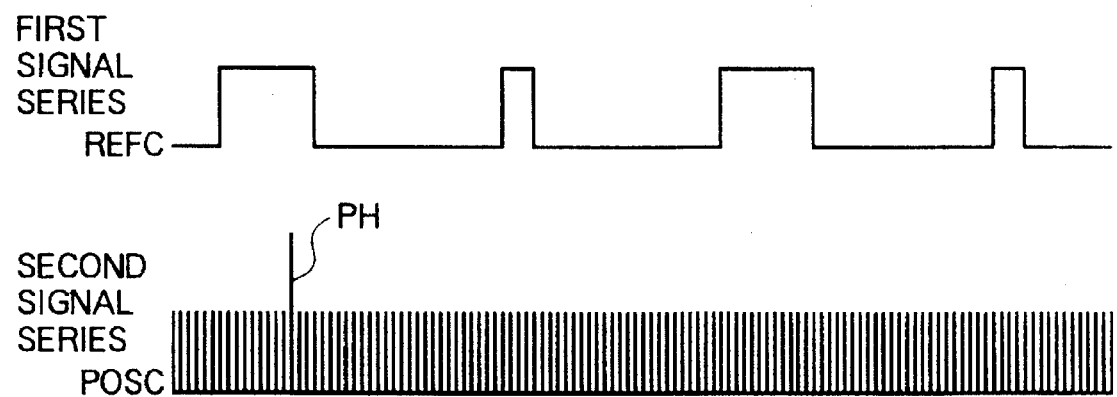
FIG. 7 is a waveform diagram for illustrating operation of an engine control apparatus according to a fourth embodiment of the invention.
Figure 8:
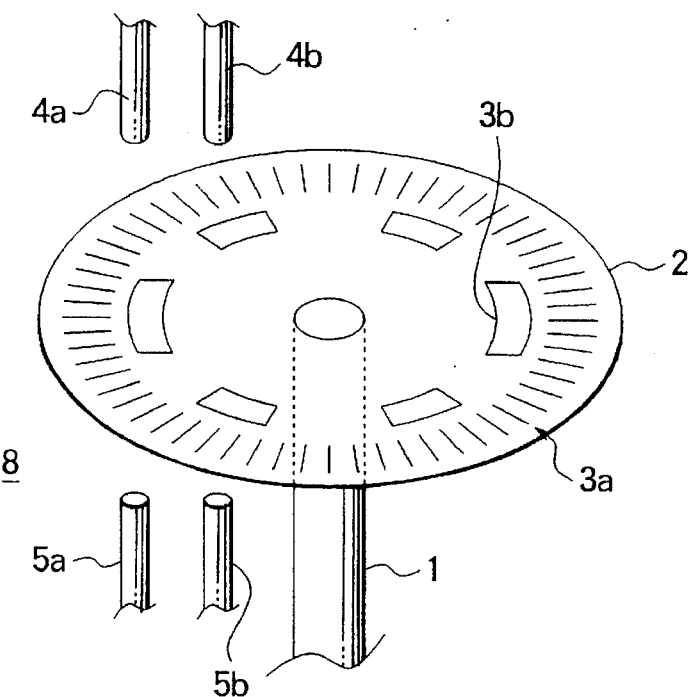
FIG. 8 is a perspective view showing a mechanical assembly of a rotation signal generator employed in a hitherto known engine control apparatus.
Figure 9:
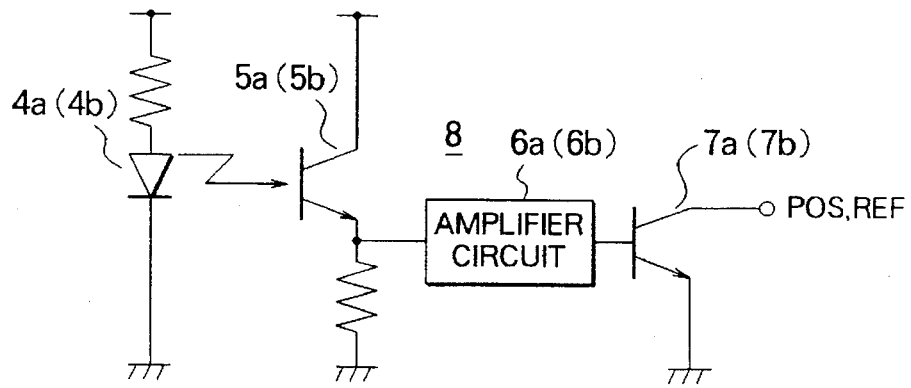
FIG. 9 is a circuit diagram showing an electric signal processing circuit of the rotation signal generator employed in the hitherto known engine control apparatus.
Figure 10:
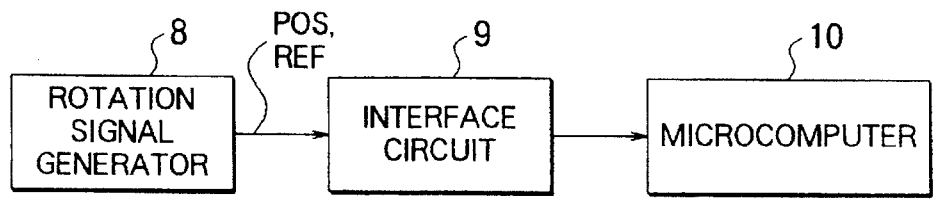
FIG. 10 is a block diagram showing a structure of the engine control apparatus known heretofore.
Figure 11:
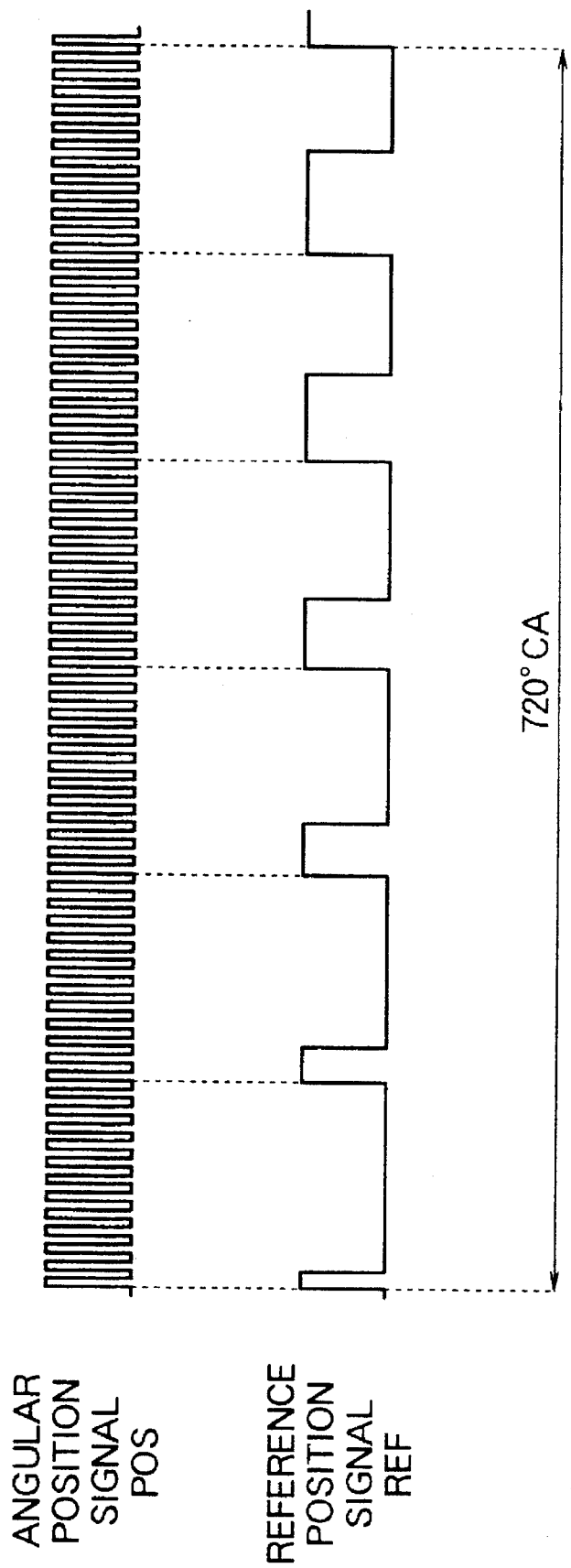
FIG. 11 is a waveform diagram for illustrating operation of the same.

FIG. 7 is a waveform diagram for illustrating operation of the engine control apparatus according to a fourth embodiment of the invention in which a pulse PH corresponding to the specific cylinder is set to a higher level than that of the other angular position signal pulses, wherein the temporal position at which the pulse PH having the different level is generated is utilized as the control timing for the backup control operation.

More specifically, in the case of the control apparatus according to the instant embodiment of the invention, the teeth 82a are formed in succession without interruption (corresponding to the constant level interval τ) and a permanent magnet (not shown) is provided in place of a tooth 82a at one location (in the circumferential edge of the rotating disk 2) in correspondence to the specific cylinder.

Owing to the structure described above, the second signal series POSC includes the pulse PH which has a higher level than the angular position signal pulses, as illustrated in FIG. 7, for allowing the specific cylinder to be identified discriminatively from the other cylinders.

More specifically, because the reference position θR detected immediately after detection of the pulse PH having the level different from that of the angular position signal pulses corresponds to the cylinder #1, the reference positions θR for the other cylinders can be identified sequentially in succession.

Besides, when abnormality takes place in the first signal series REFC, the angular position signal pulses (control timings) for the individual cylinders can be determined by counting the angular position signal pulses, starting from the time point at which the pulse PH generated. Thus, the backup control capability can be ensured.

By generating the pulse PH having the level or amplitude differing from that of the angular position signal pulses, it is possible to identify discriminatively the specific or given one of the engine cylinders without waiting for lapse of the constant level interval τ (see FIGS. 4 to 6). Thus, the reference position θR for the specific or given cylinder can be detected without any appreciable delay.

Modifications

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the functions of the various means 101, 102, 103, 104 and 105 mentioned hereinbefore may be implemented softwarewise by preparing corresponding programs to be executed by a central processing unit (CPU) of the microcomputer 100 without departing from the scope of the invention. Although the invention has been described on the assumption that it is applied to a four-cylinder internal combustion engine, the basic concept of the invention may find application to other type internal combustion engines. It goes without saying that an alarm function for indicating occurrence of abnormality upon detection thereof in the first or second signal series (REFC, POSC) may be incorporated. Furthermore, although it has been described that the pulse for identifying the specific or given one of the cylinder groups has a longer duration than the other pulses, it may readily be appreciated that the identifying pulse has a shorter duration.

Accordingly, all suitable modifications and equivalents may be resorted to, falling within the spirit and scope of the invention.

What is claimed is:

1. A control apparatus for an internal combustion engine, comprising:

first signal detector means for generating a first signal series in synchronism with rotation of a crank shaft of said internal combustion engine;

second signal detector means for generating a second signal series in synchronism with rotation of a cam shaft driven with a speed reduction ratio of "½" relative to said crank shaft; and control means for controlling parameter involved in operation of said internal combustion engine on the basis of at least one of said first and second signal series;

said first signal series including a reference position signal generated at every first predetermined angular position of said crank shaft in correspondence to reference positions of engine cylinders, respectively;

said reference position signal including pulses corresponding to said cylinders, respectively, one of said pulses corresponding to a given one of cylinder groups having a shape differing from the shape of the other pulse corresponding to the other cylinder group;

said second signal series including an angular position signal generated at every second predetermined angular position of said cam shaft and a cylinder identifying signal corresponding to a given one of said engine cylinders;

said control means including:
reference position detecting means for detecting said reference position on the basis of at least said first signal series;
cylinder group identifying means for identifying said cylinder groups, respectively, on the basis of at least said first signal series;
cylinder identifying means for identifying said cylinders, respectively, on the basis of at least said second signal series; and
control timing arithmetic means for arithmetically determining a timing for controlling said parameter on the basis of result of identification obtained from at least one of said cylinder group identifying means and said cylinder identifying means.

2. An engine control apparatus according to claim 1, wherein said pulse contained in said reference position signal and corresponding to said given one cylinder group differs in pulse width from the pulse corresponding to said other cylinder group.

3. An engine control apparatus according to claim 1, wherein said reference position signal contains an additional pulse generated within a predetermined angular range in the vicinity of the pulse corresponding to said given one cylinder group.

4. An engine control apparatus according to claim 1, wherein said pulse contained in said reference position signal and corresponding to said given one cylinder group overlaps said cylinder identifying signal in respect to the phase.

5. An engine control apparatus according to claim 1, wherein said control timing arithmetic means arithmetically determines said control timing for said parameter on the basis of result of cylinder identification performed by said cylinder identifying means, reference positions for said cylinders and a count value of said angular position signal pulses.

6. An engine control apparatus according to claim 1, wherein said cylinder group identifying means counts said angular position signal pulses during periods corresponding to pulse widths contained in said reference position signal to identify said given one cylinder group on the basis of the result of said counting.

7. An engine control apparatus according to claim 1, wherein said cylinder group identifying means identifies said cylinder groups, respectively, on the basis of duty ratios of the pulses contained in said reference position signal.

8. An engine control apparatus according to claim 1, wherein said cylinder identifying means identifies said given one cylinder on the basis of the cylinder identifying signal contained in said second signal series while identifying the other cylinders on the basis of count values obtained by counting said angular position signal pulses, respectively, starting from said given one cylinder identifying signal.

9. An engine control apparatus according to claim 1, wherein said cylinder identifying signal is represented by a constant low "L" interval during which said angular position signal pulses are not generated continuously over a predetermined angular range.

10. An engine control apparatus according to claim 1, wherein said cylinder identifying signal is represented by a constant high "H" level interval during which said angular position signal pulses are concatenated continuously over a predetermined angular range.

11. An engine control apparatus according to claim 1, wherein said cylinder identifying signal is represented by a pulse having a level differing from that of said angular position signal pulses.

12. An engine control apparatus according to claim 1, said first signal detecting means including:
a first rotating disk fixedly mounted on said crank shaft said first rotating disk having an outer peripheral edge formed with first and second projections extending radially outwardly, said first projection having a length differing from that of the second projection as viewed in a circumferential direction of said first rotating disk; and
first sensor means disposed stationarily in opposition to the outer peripheral edge of said first rotating disk for detecting said radial projections to thereby generate said first signal series, wherein said pulse for said given one cylinder group is generated in response to detection of said first projection,
said second signal detecting means including:
a second rotating disk fixedly mounted on said cam shaft of said engine for corotation therewith, said cam shaft being operatively connected to said crank shaft by way of a transmission means having a reduction ratio of "½", said second rotating disk having an outer peripheral edge formed with a plurality of teeth projecting extending radially outwardly with a pitch corresponding to said predetermined angle of said crank shaft, and a non-toothed segment which extends along the outer periphery of said second rotating disk over a predetermined angular range and in which said teeth are absent; and
second sensor means disposed stationarily in opposition to the outer peripheral edge of said second rotating disk for detecting said teeth and said non-toothed segment to thereby generate said second signal series containing said angular position signal pulses and said constant level, respectively.

13. An engine control apparatus according to claim 12, wherein position of a trailing edge of said non-toothed segment as viewed in a rotational direction of said first rotating disk is so selected as to define the reference position for determining control timing for said given one cylinder group including the cylinders which can be controlled substantially simultaneously.

14. An engine control apparatus according to claim 1, wherein said control means further comprises:
abnormality decision means for outputting an abnormality decision signal to at least said control timing arithmetic means upon detection of abnormality in one of said first and second signal series.

15. An engine control apparatus according to claim 14, wherein when said abnormality decision signal indicates abnormality of said second signal series, said control timing arithmetic means arithmetically determines said control timing for said parameter on the basis of result of cylinder group identification outputted from said cylinder group identifying means and reference positions for said cylinder groups, respectively.

16. An engine control apparatus according to claim 14, wherein when said abnormality decision signal indicates abnormality of said first signal series, said control timing arithmetic means arithmetically determines said control timing for said parameter on the basis of the result of cylinder identification outputted from said cylinder identifying means and a count value of pulses of said angular position signal.

* * * * *